United States Patent
Drusinsky (12)

(10) Patent No.: US 12,476,791 B2
(45) Date of Patent: Nov. 18, 2025

(54) METHOD FOR TIME, PATH, AND LOCATION BASED ENCRYPTION AND DECRYPTION

(71) Applicant: THE UNITED STATES OF AMERICA, AS REPRESENTED BY THE SECRETARY OF THE NAVY, Arlington, VA (US)

(72) Inventor: Doron Drusinsky, Cupertino, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 47 days.

(21) Appl. No.: 18/680,498

(22) Filed: May 31, 2024

(65) Prior Publication Data

US 2025/0226980 A1    Jul. 10, 2025

Related U.S. Application Data

(60) Provisional application No. 63/618,773, filed on Jan. 8, 2024.

(51) Int. Cl.
*H04L 9/08* (2006.01)
*H04L 9/30* (2006.01)

(52) U.S. Cl.
CPC .......... *H04L 9/0816* (2013.01); *H04L 9/0869* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 11,089,316 B2 * | 8/2021 | Makeev | H04N 19/30 |
| 2005/0050328 A1 * | 3/2005 | Mizrah | H04L 9/0844 |
| | | | 713/171 |

(Continued)

OTHER PUBLICATIONS https://en.wikipedia.org/wiki/Enigma_machine, Unknown Author.

(Continued)

*Primary Examiner* — Bradley W Holder
(74) *Attorney, Agent, or Firm* — Heber Martin Carbajal; Scott Bell

(57) ABSTRACT

A method of encrypted communications comprising: by the sender; generating a first symmetric key, calculating the first symmetric key based on the intended spatiotemporal identifiers; encrypting the decipherable message with the coordinates of the first symmetric key to produce an encrypted message Dm; generating a second symmetric key; encrypting the encrypted message Dm with the coordinates of the second symmetric key to produce an encrypted message Cm; receiving the public key from the receiver; calculating a point P1 and a point P2; transmitting the encrypted message Cm, point P1, and point P2; by the receiver; transmitting the public key to the sender; determining the actual spatiotemporal identifiers; receiving the encrypted message Cm, point P1, and point P2; calculating the second symmetric key, decrypting the encrypted message Cm asymmetrically to reproduce the encrypted message Dm; decrypting the encrypted message Dm symmetrically with the actual spatiotemporal identifiers.

20 Claims, 4 Drawing Sheets

(56) References Cited

U.S. PATENT DOCUMENTS

2006/0018473 A1* 1/2006 Hori .................. G11B 20/0021
380/255
2021/0092613 A1* 3/2021 Palyutina ............... G06Q 40/04

OTHER PUBLICATIONS https://en.wikipedia.org/wiki/Mission:_Impossible_(film_series), Unknown Author.
L. Scott and D. E. Denning, "A location based encryption technique and some of its applications," in Proc. Inst. Navig. Nat. Tech. Meeting, 2003, pp. 734-740.
Data encryption standard (DES), National Institute of Standards and Technology, Gaithersburg, MD, USA FIPS Pub 46-3, 1999. [Online]. Available: https://csrc.nist.gov/files/pubs/fips/46-3/final/docs/fips46-3.pdf.
V. S. Miller, "Use of elliptic curves in cryptography," in Proc. Conf. Theory Appl. Cryptography Techn. (Crypto), Springer-Verlag, Berlin, Germany, 1985, pp. 417-426, doi:10.1007/3-540-39799-X_31.
N. Koblitz, "Elliptic curve cryptosystems," Math. Comput., vol. 48, No. 177, pp. 203-209, 1987, doi: 10.1090/S0025-5718-1987-0866109-5.
https://en.wikipedia.org/wiki/Elliptic_curve, Unknown Author.
https://www.embedded.com/an-introduction-to-elliptic-curve-cryptography/, Unknown Author.
D. Drusinsky, "Cryptographic-biometric self-sovereign personal identities," Computer, vol. 55, No. 6, pp. 96-102,Jun. 2022, doi: 10.1109/MC.2022.3164527.
10. "Digital signature standard (DSS)," National Institute of Standards and Technology, Gaithersburg, MD, USA, FIPS 186-4, 2013. Accessed: Nov. 10, 2022. [Online]. Available: https://csrc.nist.gov/publications/detail/fips/186/4/final.
https://en.wikipedia.org/wiki/Triple_DES, Unknown Author.
https://en.wikipedia.org/wiki/Decimal_degrees, Unknown Author.
https://en.wikipedia.org/wiki/Two%27s_complement, Unknown Author.

* cited by examiner

METHOD FOR TIME, PATH, AND LOCATION BASED ENCRYPTION AND DECRYPTION

CROSS-REFERENCE TO RELATED APPLICATIONS

This patent application takes priority from U.S. Provisional Patent Application No. 63/618,773, filed on Jan. 8, 2024, titled Encrypting for Time-Based and/or Path-based and/or Location-Based Decryption, the contents of which are expressly incorporated herein by this reference as though set forth in their entirety and to which priority is claimed.

FIELD OF USE

The present disclosure relates, in general, to a method of encrypting and decrypting communications. More specifically, the present disclosure relates to a method of encrypting and decrypting communications using time, path, and or location.

BACKGROUND

Generally, encryption is a cryptography process used to protect data from being stolen, changed, or compromised. The process typically converts, scrambles, or rearranges decipherable data or information into ciphered or secret code that can only be deciphered or unlocked with a unique key. Ciphered data or information is encrypted and unreadable until it's converted back into decipherable data or information using a key.

Typical encrypted data or information is communicated digitally and encrypted using a symmetric key or public key algorithm.

Symmetric key cryptography uses the same cryptographic keys for both plaintext encryption and ciphertext decryption. With symmetric key encryption, the decrypting side (often called Bob) must somehow obtain the secret key from the encrypting side (Alice). A well-known symmetric key encryption system is the Enigma machine, a German device from World War II, for which secret key lists were distributed in advance.

Public-key cryptography, also called asymmetric key cryptography, is a method of encryption that uses two different keys, a public key, and a private key, to encrypt and decrypt data. Public-key cryptography relies on mathematical functions that are easy to compute in one direction but difficult to compute in the opposite direction. This ensures that only the intended recipient can decrypt the message, even if a third party intercepts the encrypted message. Public-key encryption, by contrast, has Bob generate a secret key while sending Alice a corresponding public key. Alice encrypts with Bob's public key, while Bob decrypts with his secret key. The key advantage of public-key methods over symmetric-key methods is that, with symmetric-key methods, Alice and Bob need to share the same secret key, which increases the likelihood that an adversary will discover the key during transport.

Although some public-key methods, such as elliptic curve cryptography (ECC) and Rivest-Shamir-Adelman (RSA), allow a recipient to authenticate data and communications through the use of digital signature algorithms, what is needed is a method of encryption that reduces or eliminates the risk that the encryption or decryption keys may be discovered and can reproduce or decrypts a cyphered message to a decipherable message when a spatiotemporal identifier is not exact.

SUMMARY

To minimize the limitations in the prior art, and to minimize other limitations that will become apparent upon reading and understanding the present specification, the present disclosure discloses a new and useful method of encrypted communication.

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

The problems associated with sending a symmetric key or public key for encrypted communications are solved by sending an intended spatiotemporal identifier that may be based on time, path, and location and decrypting the communication using an actual spatiotemporal identifier based on time, path, and location.

Elliptic curve cryptography ("ECC") is an algebraic structure of elliptic curves over finite fields. ECC is typically a public-key method of encryption, but when combined with a spatiotemporal identifier, it may be a symmetric key method of encryption.

An intended spatiotemporal identifier with a point generator may be used to create the symmetric key.

One embodiment of the present disclosure may include the steps of generating a first symmetric key by encrypting an intended spatiotemporal identifier based on time, path, and or location. One or more coordinates of the first symmetric key may be used to generate a second symmetric key for encrypting a decipherable message with a received public key from a receiver. The sender sends the encrypted message with a P1 and a P2 to the receiver. The receiver determines an actual spatiotemporal identifier and decrypts the encrypted message by calculating the second symmetric key. Utilizing the actual spatiotemporal identifiers, the receiver may decrypt the first encrypted message.

A method of encrypted communications comprising: a sender; a receiver; an intended spatiotemporal identifiers; and an actual spatiotemporal identifiers; wherein the sender has a decipherable message; by the sender; generating a first symmetric key, by generating a first random number and calculating a first symmetric key based at least in part on the intended spatiotemporal identifiers; wherein the first symmetric key comprises coordinates; encrypting the decipherable message with the coordinates of the first symmetric key to produce an encrypted message $D_m$; generating a second symmetric key, by generating a second random number and calculating the second symmetric key based at least in part on a point generator; wherein the second symmetric key comprises coordinates; encrypting the encrypted message $D_m$ with the coordinates of the second symmetric key to produce an encrypted message $C_m$, wherein the encrypted message $C_m$ may be an undecipherable message; generating a random scalar k; transmitting a public key to the receiver;

calculating a point P1 and a point P2; wherein point P1 may be the product of the random scalar k and the point generator, and point P2 may be the sum of the second symmetric key with the product of the random scalar k and the public key; transmitting the encrypted message $C_m$, point P1, and point P2; by the receiver; receiving the public key from the sender; determining the actual spatiotemporal identifiers; receiving the encrypted message $C_m$, point P1, and point P2; calculating the second symmetric key, wherein the second symmetric key may be calculated from the public key, the point P1, and the point P2; decrypting the encrypted message $C_m$ asymmetrically with coordinates of the second symmetric key to reproduce the encrypted message $D_m$; decrypting the encrypted message $D_m$ symmetrically with the actual spatiotemporal identifiers to reproduce an unencrypted message; and wherein the unencrypted message may be the decipherable message. Wherein the first symmetric key may be different from the second symmetric key. Wherein the first random number may be different from the second random number. Wherein the intended spatiotemporal identifier may be selected from any spatiotemporal identifiers selected from the group consisting of: latitude, longitude, or coordinated time. Wherein the actual spatiotemporal identifier may be selected from any spatiotemporal identifiers selected from the group consisting of: latitude, longitude, or time. Wherein the coordinates of the first symmetric key are selected from the group of first symmetric key coordinates consisting of: x-coordinate, y-coordinate, or z-coordinate. Wherein the coordinates of the second symmetric key are selected from the group of the second symmetric key coordinates consisting of: x-coordinate, y-coordinate, or z-coordinate. Wherein the random scalar k may be generated once, from a finite field having a prime modulo of at least 256 bits. Wherein the public key may be an ephemeral key.

Another Embodiment may be a method of encrypted communications comprising: a sender; a receiver; intended spatiotemporal identifiers; actual spatiotemporal identifiers; an upper intended truncated value; and a lower intended truncated value; wherein the sender has a decipherable message; by the sender; generating a symmetric key, by generating a random number and calculating a public key based at least in part on a point generator; computing the intended spatiotemporal identifiers, wherein the intended spatiotemporal identifier may be truncated by a minus one bit; computing gamma, wherein gamma may be the upper intended truncated value XOR with the lower intended truncated value; bit complementing gamma to produce a gamma bar; computing shared O-bits; wherein the shared O-bits are $S_o$, wherein $S_o$ may be gamma bar AND with the intended spatiotemporal identifiers; computing V-bits of the intended spatiotemporal identifiers, wherein the V-bits are v2, wherein v2 may be gamma AND with the intended spatiotemporal identifiers; encrypting the decipherable message, with the intended coordinates of the symmetric key XOR with $S_o$; wherein the encrypted decipherable message may be encrypted message $C_m$; transmitting the encrypted message $C_m$, P1, P2, v2, and gamma; by the receiver; receiving the public key from the sender; receiving $C_m$, P1, P2, v2, and gamma; calculating the symmetric key, wherein the symmetric key may be calculated from the public key, P1, P2, v2, and gamma; computing the actual spatiotemporal identifiers, wherein the actual spatiotemporal identifier may be truncated by a minus one bits; computing shared O-bits of the actual spatiotemporal identifiers; wherein the shared O-bits may be $S_o'$, wherein $S_o'$ may be gamma bar AND with the actual spatiotemporal identifiers; computing V-bits of the actual spatiotemporal identifiers, wherein the V-bits are v2', wherein v2' may be gamma AND with the actual spatiotemporal identifiers; aborting decryption if v2' may be equal to v2; wherein actual spatiotemporal identifiers may be not adjacent to the intended spatiotemporal identifiers; decrypting the encrypted message $C_m$ symmetrically with coordinates of the symmetric key XOR with the $S_o'$ to reproduce the message; and wherein the message may be decipherable data. Wherein the coordinates of the symmetric key are selected from the group of symmetric key coordinates consisting of: x-coordinate, y-coordinate, or z-coordinate. Wherein the intended spatiotemporal identifier may be selected from any spatiotemporal identifiers selected from the group consisting of: latitude, longitude, or coordinated time. Wherein the actual spatiotemporal identifier may be selected from any spatiotemporal identifiers selected from the group consisting of: latitude, longitude, or time. Wherein the public key may be an ephemeral key. Wherein the upper intended truncated value may be different from the lower intended truncated value. Wherein the coordinates of the symmetric key are selected from the group of the symmetric key coordinates consisting of: x-coordinate, y-coordinate, or z-coordinate. Wherein the the upper intended truncated value may be the upper spatiotemporal tolerance; and wherein the lower intended truncated value may be the lower spatiotemporal tolerance.

Another Embodiment may be a non-transitory computer readable medium with computer executable instructions for encrypted communications, the computer readable medium having computer executable instructions for: by the sender; generating a first symmetric key, by generating a first random number and calculating the first symmetric key based at least in part on intended spatiotemporal identifiers; wherein the first symmetric key comprises coordinates; encrypting a decipherable message with the coordinates of the first symmetric key to produce an encrypted message $D_m$; generating a second symmetric key, by generating a second random number and calculating the second symmetric key based at least in part on a point generator; wherein the second symmetric key comprises coordinates; encrypting the encrypted message $D_m$ with the coordinates of the second symmetric key to produce an encrypted message $C_m$, wherein the encrypted message $C_m$ may be an undecipherable message; generating a random scalar k; transmitting a public key to the receiver; calculating a point P1 and a point P2; wherein point P1 may be the product of the random scalar k and the point generator, and point P2 may be the sum of the second symmetric key with the product of the random scalar k and the public key; transmitting the encrypted message $C_m$, point P1, and point P2; by the receiver; receiving the public key from the sender; determining the actual spatiotemporal identifiers; receiving the encrypted message $C_m$, point P1, and point P2; calculating the second symmetric key, wherein the second symmetric key may be calculated from the public key, point P1, and point P2; decrypting the encrypted message $C_m$ asymmetrically with coordinates of the second symmetric key to reproduce the encrypted message $D_m$; decrypting the encrypted message $D_m$ symmetrically with the actual spatiotemporal identifiers to reproduce the message; and wherein the message may be decipherable data. Wherein the intended spatiotemporal identifier may be selected from any spatiotemporal identifiers selected from the group consisting of: latitude, longitude, or coordinated time. Wherein the actual spatiotemporal identifier may be selected from any spatiotemporal identifiers selected from the group consisting of: latitude, longitude, or time. Wherein the random scalar k may be generated once, from a finite field having a prime modulo of at least 256 bits.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1A:
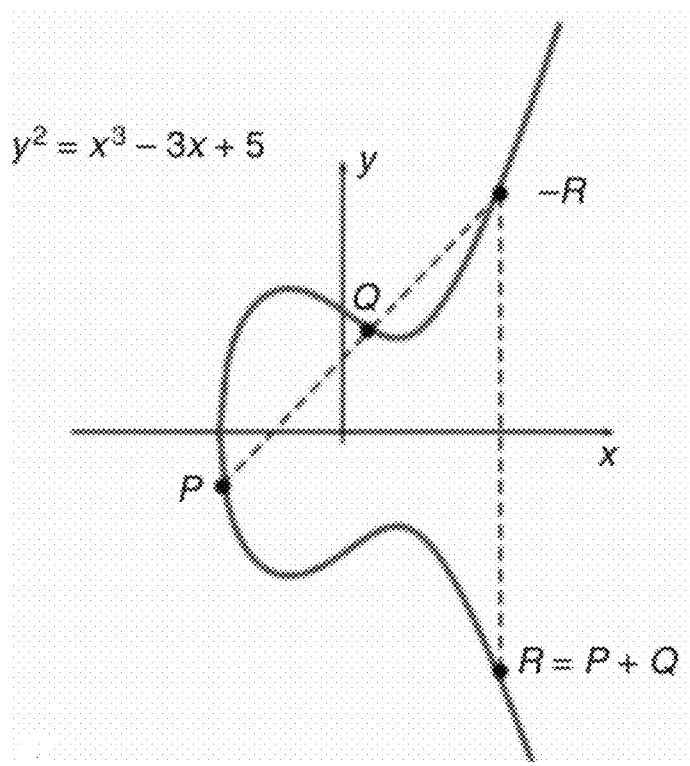
FIG. 1A-1B are two separate illustrations showing three points along an algebraic function that represents an elliptical curve.

In the following detailed description of various embodiments of the present disclosure, numerous specific details are set forth in order to provide a thorough understanding of various aspects of one or more embodiments of the present disclosure. However, one or more embodiments of the present disclosure may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the devices, systems, and methods of the present disclosure will become apparent to those skilled in the art from the following detailed description, which shows and describes illustrative embodiments of the devices, systems, and methods of the present disclosure. As will be realized, the devices, systems, and methods of the present disclosure are capable of modifications in various obvious aspects, all without departing from the spirit and scope of the present disclosure. Accordingly, the screenshot figures, and the detailed descriptions thereof, are to be regarded as illustrative in nature and not restrictive. Also, the reference or non-reference to a particular embodiment of the devices, systems, and methods of the present disclosure shall not be interpreted to limit the scope of the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Furthermore, the one or more versions may be implemented as a method, apparatus, or article of manufacture using standard programming and/or engineering techniques to produce entirely hardware embodiment, an entirely software embodiment, or an embodiment combining software and hardware embodiments. Furthermore, the systems and methods may take the form of Non-transitory computer readable media. More particularly, the present methods and systems may take the form of web-implemented computer software or a computer program product. Any suitable computer-readable storage medium may be utilized including, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick).

Those skilled in the art will recognize many modifications may be made to this configuration without departing from the scope of the disclosed embodiments.

Embodiments of the systems and methods are described below with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of the various embodiments of the device, method, and/or system. For example, as used herein, the terms "computer" and "computer system" generally refer to any device that processes information with an integrated circuit chip and/or central processing unit (CPU).

As used herein, the terms "software" and "application" refer to any set of machine-readable instructions on a machine, web interface, and/or computer system" that directs a computer's processor to perform specific steps, processes, or operations disclosed herein.

As used herein, the term "computer-readable medium" refers to any storage medium adapted to store data and/or instructions that are executable by a processor of a computer system. The computer-readable storage medium may be a computer-readable non-transitory storage medium and/or any non-transitory data storage circuitry (e.g., buggers, cache, and queues) within transceivers of transitory signals. The computer-readable storage medium may also be any tangible computer readable medium. In various embodiments, a computer readable storage medium may also be able to store data, which is able to be accessed by the processor of the computer system.

As used herein, the term "ciphered message" refers to an encrypted message transformed from an unencrypted message using an encryption algorithm.

As used herein, the term "elliptic-curve cryptography" or "ECC" refers to an algebraic structure of elliptic curves over finite fields.

As used herein, the term "decrypt" refers to making a coded or cyphered message intelligible.

As used herein, the term "decryptor" refers to a person or a thing, such as an algorithm, program, or device that decrypts.

As used herein, the term "encrypt" refers to converting an intelligible message into a coded or cyphered message.

As used herein, the term "encryptor" refers to a person or something that encrypts, such as an algorithm, program, or device.

As used herein, the term "message" refers to verbal, written, or recorded communications sent to the recipient. Messages may include information or data.

As used herein, the term "spatiotemporal identifier" refers to space, time, and location identifier data used as an encryption key.

As used herein, the term "waypoint" refers to an intermediate point or place on a route or line of travel, a stopping point or point at which course is changed.

Communication may be the process of exchanging information between one or more parties through a common system of symbols, signs, or behavior. Communications may occur through analog or digital representations of the physical characteristics of the symbols, signs, or behaviors. Analog communication represents the symbols, signs, or behaviors in continuous quantity representations. In contrast, a digital communication system represents the symbols, signs, or behaviors as a series of zeros and ones, typically represented by a value of a physical quantification such as but not limited to voltage or magnetic polarization.

Communication systems may include a medium whereby a message may be sent from a sender to a receiver. A medium may include but is not limited to free space, a network, an optical fiber, or an electrically conductive element. In a typical medium, a message may be received by any number of receivers, including unintended receivers. Receipt of a message by an unintended receiver may have unexpected consequences. In order to protect or keep the message secret, the message may be encrypted to control who is authorized to receive the message.

Encrypting communications may involve scrambling the analog or digital communications, also referred to as plain text, into ciphertext, which may be unreadable text that may only be decoded with a secret key. Encryption techniques typically utilize mathematical concepts and principles such as but not limited to modular arithmetic, prime numbers, number theory, linear algebra, probability theory, and information theory.

Encryption systems may utilize one or a combination of integrated circuits, electronic circuits, processors, or co-processors to perform the mathematical concepts and principles to encrypt and decrypt communications.

Figure 1B:
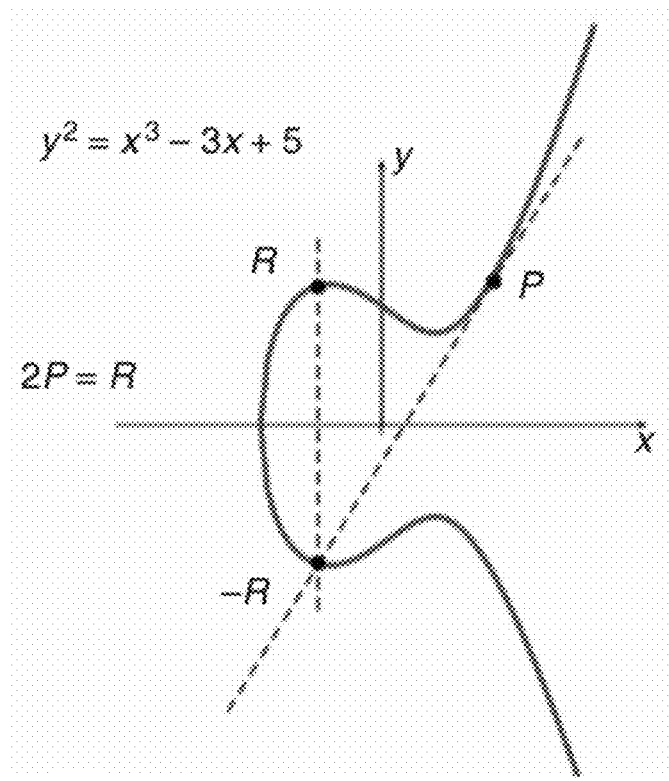

FIG. 1A and 1B are two separate illustrations showing three points along an algebraic function representing an elliptical curve. Elliptic curve cryptography ("ECC") may be a public key cryptography algorithm that may be used to perform critical functions, including but not limited to encryption, authentication, and digital signature. ECC is an algebraic function of elliptic curves over finite fields. ECC may allow for smaller keys while still providing equivalent security. An elliptic curve is a plane curve over a finite field that consists of points that satisfy the equation below and with a distinguished point at infinity.

$$y^2 = x^2 + ax + b$$

The scalars are preferably taken from a large finite field Fp of integer modulo p, where p is typically a 256-bit or larger prime number. These equations form curves whose shapes depend on the values of the constants a and b. ECC arithmetic operates on an algebraic group g of points on the curve, augmented by a zero element that is a point in infinity. Each point P=(x, y) on the curve is a pair of scalars from Fp.

The allowed operations in g are point inverse, point addition, point subtraction, and point multiplication by a scalar. Every such group g has a generator point G such that event point P∈g is the product of G by some scalar c in F, that is, P=cG; the standard elliptic curve notation is that lowercase letters denote scalars in Fp, while capital letters denote points on the curve. Division is preferably not one of the operations allowed in g. Cryptographic security relies on the difficulty of the discrete logarithm problem given two points, P and Q, where P=dQ, yet d may not be computed in a reasonable time. Addition and subtraction in an elliptic curve group g use two properties of these curves: 1. A straight line through a curve crosses it in three points. 2. A curve is symmetrical about the x-axis. −P is defined as the point symmetric to P on the curve. Point P+Q is defined as R, with −R being the third point along the line that goes through x and y, as illustrated in FIG. 1(a). For the special case P=Q, −R is defined as the intersection of the curve's tangent line at P and the curve, as illustrated in FIG. 1(b). The 0 point (point in infinity) is the group's 0 element, that is, P+0=P. With ECC public-key cryptography, a key pair d, Q consists of a private key d∈F and a corresponding public key Q=dG. The private key is a secret; it should be stored securely on the device, where it is used for decryption or signing. By contrast, as its name suggests, the corresponding public key is not a secret. Calculating the public key Q is easily computable when d and G are given because it is a multiplication of a scalar by a point. However, as mentioned earlier, the private key d cannot be efficiently computed when Q and G are known.

Figure 2:
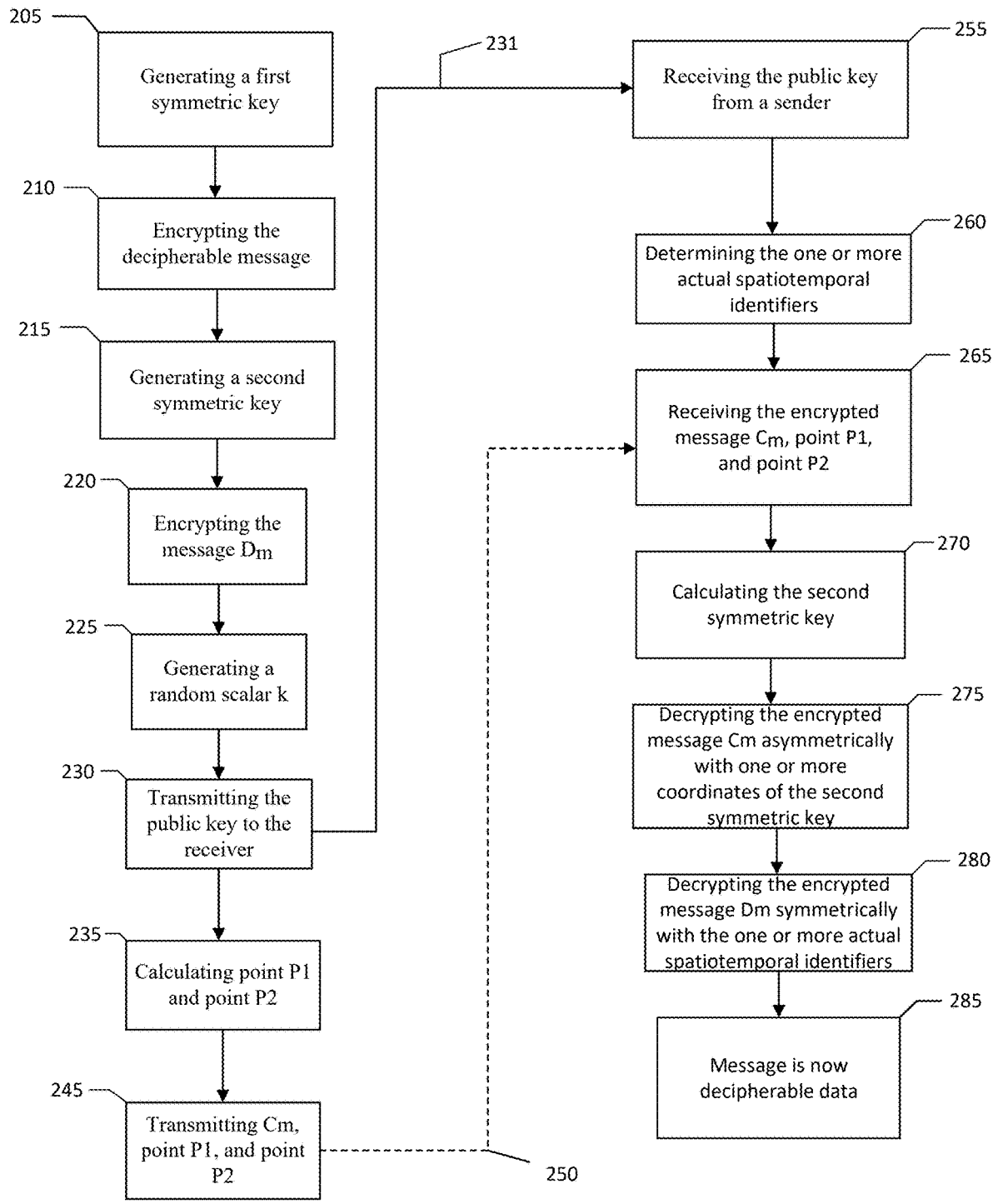
FIG. 2 is a flow block diagram of one method of elliptic curve cryptography utilizing spatiotemporal identifiers.

FIG. 2 is a flow block diagram of one method of elliptic curve cryptography utilizing spatiotemporal identifiers. Expected or intended spatiotemporal identifiers such as but not limited to latitude, longitude, and UPS time may be used to encrypt a message that may be decoded using actual spatiotemporal identifiers associated with intended spatiotemporal identifiers.

One embodiment of ECC time and location base encryption may include the following steps:

By a Sender (Alice):
1) Generating 205 a first symmetric key, by utilizing an intended spatiotemporal identifier, generating a random number r in $F_p$, and calculating $P_m$=rG. The intended spatiotemporal identifier may include but is not limited to latitude, longitude, or time.
2) Encrypting 210, by using the x coordinate of $P_m$ ($P_{m-x}$) as the symmetric key to encrypt the decipherable or plain text message to a cipher text message $D_m$.
3) Generating 215 a second symmetric key by generating a second random number r in $F_p$ and calculating $P_m$=rG.
4) Encrypting 220 by using the x coordinate of the second symmetric key to encrypt the cipher text message $D_m$ to $C_m$.
5) Generating 225 a one-time random scalar k in $F_p$.
6) Receiving 230 public key Q from a receiver.
7) Calculating 235 point P1 and point P2; where P1=kG and P2=$P_m$+kQ.
8) Transmitting 245 $C_m$, P1, and P2 to a receiver through a receiving medium 250. Receiving medium 250 may include but is not limited to free space, optical, or an electromagnetic conductive medium.

By a Receiver (Bob):
9) Receiving 255 the public key from a sender through a transmitting medium 231. Alternatively, a receiver may already possess a public key. Transmitting medium 231 may include but is not limited to free space, optical, or an electromagnetic conductive medium.
10) Determining 260 one or more actual spatiotemporal identifiers. Actual spatiotemporal identifiers may include but are not limited to actual latitude, actual longitude, current time, or any other measure of time and location.
11) Receiving 265 an encrypted message Cm, point P1, and point P2 from a sender.
12) Calculating 270 the second encrypted key from point P1 and point P2. Where $P_m$=P2−dP1, where P2−dP1=$P_m$+kQ+dkG=$P_m$+kQ−dkG=$P_m$+kQ−kdG=$P_m$+kQ−kQ=$P_m$. Where P1=kG and P2=$P_m$+kQ.
13) Decrypting 275 the encrypted Cm asymmetrically with one or more coordinates of the second symmetric key to produce $D_m$.
14) Decrypting 280 Dm symmetrically with the actual one or more spatiotemporal identifiers.
15) Message is decipherable 285. Message or data may be intelligible.

In alternative embodiment, the spatiotemporal identifier may not be a single location and time-based identifier, but a set of identifiers based on a route, path, or trajectory defined by one or more sets of waypoints.

In an alternative embodiment, a sender may XOR the x coordinate of Pm with the Intended spatiotemporal identifiers to create a single symmetric key from the two symmetric keys. The encrypted message may then also be decrypted by XOR the x coordinate of Pm with the actual spatiotemporal identifiers.

In an alternative embodiment, a sender may round the intended spatiotemporal identifiers to produce a tolerance. In order to not produce a similar error, a receiver may round the actual spatiotemporal identifiers to create a tolerance between the intended spatiotemporal identifiers and the actual spatiotemporal identifiers in order to encrypt and reliably decrypt a message. Tolerances may be integrated into both the intended and actual spatiotemporal identifiers by rounding the intended spatiotemporal identifiers and the actual spatiotemporal identifiers prior to being XORed with Pm·x to produce a symmetric key.

In an alternative embodiment, a receiver may attempt to decrypt using three different values for each to the one or more actual spatiotemporal identifiers truncated by (ba+d−1) and (ba+d+1) where the tolerance may be ($2^{ba-1}$, $2^{ba-1}$).

Rounding representative bits may also introduce rounding errors, which may require error handling to decrypt a message correctly.

Figure 3:
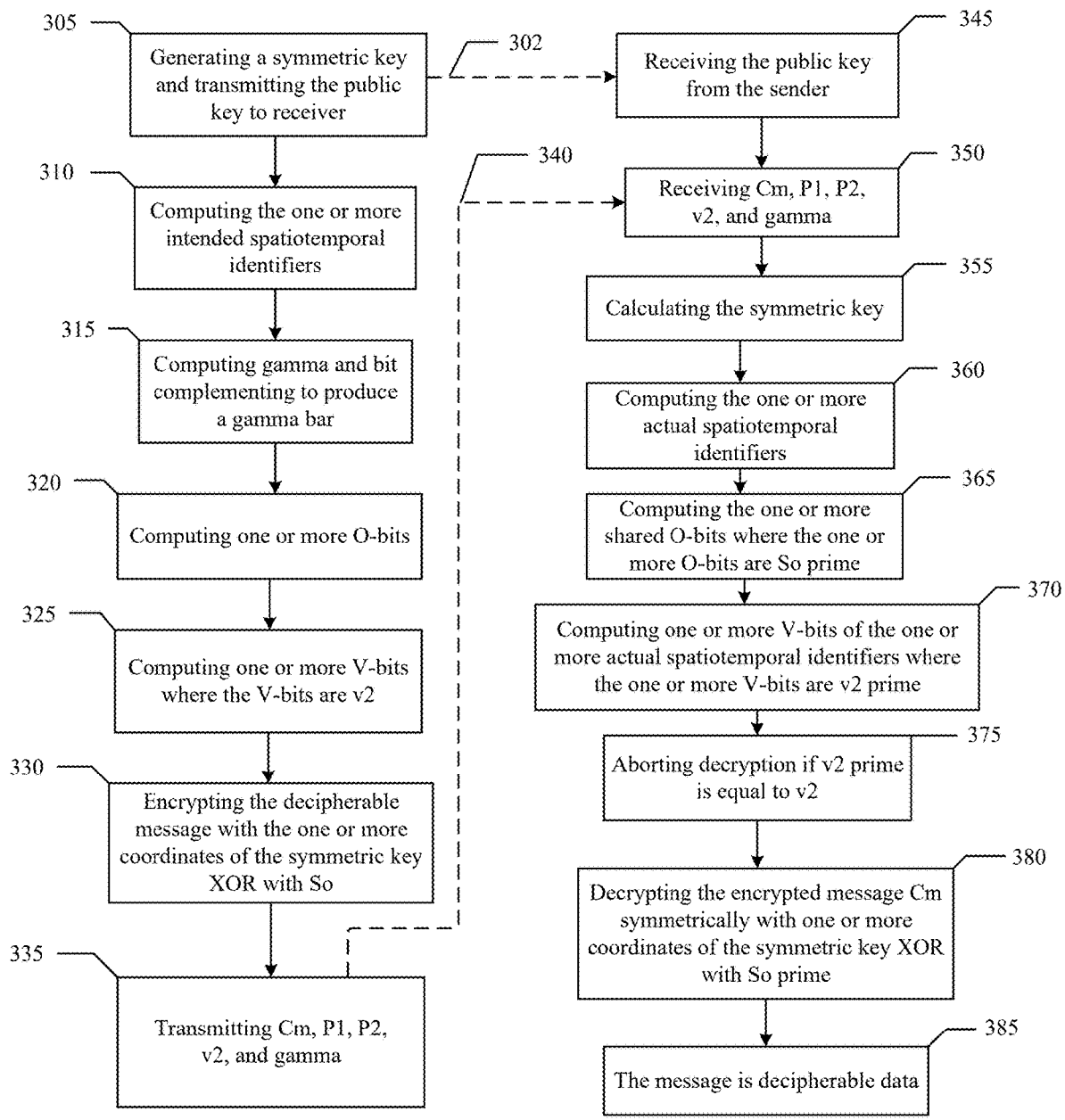
FIG. 3 is a flow block diagram of one method of elliptic curve cryptography utilizing spatiotemporal identifiers with an upper and lower tolerance.

FIG. 3 is a flow block diagram of one method of elliptic curve cryptography utilizing spatiotemporal identifiers with an upper and lower tolerance. Differences between the intended and actual spatiotemporal identifiers may not allow for a message to be decrypted properly. Incorporating an upper tolerance La and a lower tolerance Lb for differences may allow an actual spatiotemporal identifier to decrypt a message related to an intended spatiotemporal identifier Lo where a tolerated difference in the actual spatiotemporal identifier exists. Digital bit error handling techniques, such as but not limited to Hamming code, may incorporate a tolerance to an ECC message. Hamming code may reduce the need for an actual spatiotemporal identifier to be exactly the same as an intended spatiotemporal identifier to decrypt a message. By marking the least significant bits as V bits and all the other bits as shared bits, an upper tolerance La and lower tolerance Lb of the spatiotemporal identifiers may be incorporated to allow for the decryption of an encrypted message.

One embodiment of ECC time and location base encryption utilizing a tolerance may include the following steps:

By a Sender (Alice):

1) Generating 305 a symmetric key by generating a random number r in $F_p$ and calculating $P_m$=rG. Receiving a public key from a receiver through transmitting medium 231 may include but is not limited to free space, optical, or an electromagnetic conductive medium.
2) Computing 310 one or more intended spatiotemporal identifiers. The intended spatiotemporal identifier may include but is not limited to latitude, longitude, or time.
3) Computing 315 gamma and bit complementing gamma to produce gamma bar. Gamma is the bit operation of the upper tolerance La XOR lower tolerance Lb. This operation produces all zeros in the shared bit locations and ones in the V bit locations. Gamma bar thereby has ones in the shared bit locations and zeros in the V bit locations. This produces four possible V-bit pairs: 00, 01, 10, and 11. The 10 V bit pair is the bit complement of the intended spatiotemporal identifier $L_o$ and, therefore, not adjacent to the intended spatiotemporal identifier $L_o$ and, therefore, should be excluded as a result.
4) Computing 320 one or more shared O-bits of the intended spatiotemporal identifier $L_o$. The shared O-bits are So where $S_o$=Gamma bar AND intended spatiotemporal identifier $L_o$. (So=γ bar $\wedge L_o$).
5) Computing 325 one or more V-bits of intended spatiotemporal identifier $L_o$. The V-bits of intended spatiotemporal identifier $L_o$ are v2 where v2=gamma AND intended spatiotemporal identifier $L_o$. (v2=γ$\wedge L_o$).
6) Encrypting 330 the decipherable message (plain text) with one or more coordinates of the symmetric key XOR with $S_o$. ($P_m$·x⊕$s_o$).
7) Transmitting 335 $C_m$, P1, P2, v2, and gamma. Receiving medium 350 may include but is not limited to free space, optical, or an electromagnetic conductive medium. Where P1=kG and P2=$P_m$+kQ.

By a Receiver (Bob):

8) Receiving 345 the public key from a sender through a transmitting medium 302. Alternatively, a receiver may already possess a public key. Transmitting medium 302 may include but is not limited to free space, optical, or electromagnetic conductive medium.
9) Receiving 350 Cm, v2, and gamma from a sender.
10) Calculating 355 the symmetric key from point P1 and point P2. Where $P_m$=P2−dP1, where P2−dP1=$P_m$+kQ+dkG=$P_m$+kQ−dkG=$P_m$+kQ−kdG=$P_m$+kQ−kQ=$P_m$. Where P1=kG and P2=$P_m$+kQ.
16) Computing 360 one or more actual truncated spatiotemporal identifiers. Actual spatiotemporal identifiers may include but are not limited to actual latitude, actual longitude, current time, or any other measure of time and location.
11) Computing 365 one or more shared O-bits of the one or more actual truncated spatiotemporal identifiers. Where the share O-bits are $S_o$', and $S_o$'=gamma bar AND one or more actual truncated spatiotemporal identifiers. ($S_o$'=γ bar $\wedge a_o$).
12) Computing 370 one or more V-bits of the one or more actual truncated spatiotemporal identifiers. Where the one or more V-bits are v2', and v2'=gamma AND the one or more actual truncated spatiotemporal identifiers. (v2'=γ$\wedge a_o$).
13) Aborting decryption 375 if v2' bar is equal to v2. If v2' bar is equal to v2, this is an indication that the one or more actual spatiotemporal (ao) identifiers are not adjacent to the one or more intended spatiotemporal (lo) identifiers. Where v2' bar is the compliment of v2'.
14) Decrypting 380 the encrypted message $C_m$ symmetrically with the one or more coordinates of the symmetric key XOR with $S_o$'. ($P_m$·x⊕$s_o$').
15) Message is decipherable 385. Message or data may be intelligible.

In alternative embodiment, the spatiotemporal identifier may not be a single location and time-based identifier but a set of identifiers with tolerances based on a route, path, or trajectory defined by one or more sets of waypoints.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The processes or methods depicted in the figures may be performed by processing logic that comprises hardware (e.g., circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A method of encrypted communications comprising:
   a sender;
   a recipient;
   one or more intended spatiotemporal identifiers; and
   one or more actual spatiotemporal identifiers;
   wherein the sender has a decipherable message;
   by the sender;
   generating a first symmetric key, by generating a first random number and calculating a first symmetric key based at least in part on the one or more intended spatiotemporal identifiers;
      wherein the first symmetric key comprises one or more coordinates;
   encrypting the decipherable message with the one or more coordinates of the first symmetric key to produce an encrypted message $D_m$;
   generating a second symmetric key, by generating a second random number and calculating the second symmetric key based at least in part on a point generator;
      wherein the second symmetric key comprises one or more coordinates;
   encrypting the encrypted message $D_m$ with the one or more coordinates of the second symmetric key to produce an encrypted message $C_m$, wherein the encrypted message $C_m$ is an undecipherable message;
   generating a random scalar k;
   transmitting a public key to the recipient;
   calculating a point P1 and a point P2;
      wherein point P1 is the product of the random scalar k and the point generator, and point P2 is the sum of the second symmetric key with the product of the random scalar k and the public key;
   transmitting the encrypted message $C_m$, point P1, and point P2;
   by the recipient;
   receiving the public key from the sender;
   determining the one or more actual spatiotemporal identifiers;
   receiving the encrypted message $C_m$, point P1, and point P2;
   calculating the second symmetric key, wherein the second symmetric key is calculated from the public key, the point P1, and the point P2;

decrypting the encrypted message $C_m$ asymmetrically with one or more coordinates of the second symmetric key to reproduce the encrypted message $D_m$;

decrypting the encrypted message $D_m$ symmetrically with the one or more actual spatiotemporal identifiers to reproduce an unencrypted message; and wherein the unencrypted message is the decipherable message.

2. The method of claim 1 wherein the first symmetric key is different from the second symmetric key.

3. The method of claim 1 wherein the first random number is different from the second random number.

4. The method of claim 1 wherein the one or more intended spatiotemporal identifier is selected from any one or more spatiotemporal identifiers selected from the group consisting of: latitude, longitude, or coordinated time.

5. The method of claim 1 wherein the one or more actual spatiotemporal identifier is selected from any one or more spatiotemporal identifiers selected from the group consisting of: latitude, longitude, or time.

6. The method of claim 1 wherein the one or more coordinates of the first symmetric key are selected from the group of first symmetric key coordinates consisting of: x-coordinate, y-coordinate, or z-coordinate.

7. The method of claim 1 wherein the one or more coordinates of the second symmetric key are selected from the group of the second symmetric key coordinates consisting of: x-coordinate, y-coordinate, or z-coordinate.

8. The method of claim 1 wherein the random scalar k is generated once, from a finite field having a prime modulo of at least 256 bits.

9. The method of claim 1 wherein the public key is an ephemeral key.

10. A method of encrypted communications comprising:
a sender;
a recipient;
one or more intended spatiotemporal identifiers;
one or more actual spatiotemporal identifiers;
an upper intended truncated value; and
a lower intended truncated value;
wherein the sender has a decipherable message;
by the sender;
generating a symmetric key, by generating a random number and calculating a public key based at least in part on a point generator;
computing the one or more intended spatiotemporal identifiers, wherein the one or more intended spatiotemporal identifier is truncated by a minus one bit;
computing gamma, wherein gamma is the upper intended truncated value XOR with the lower intended truncated value;
bit complementing, gamma to produce a gamma bar;
computing one or more shared O-bits; wherein the one or more shared O-bits are $S_o$, wherein $S_o$ is gamma bar AND with the one or more intended spatiotemporal identifiers;
computing one or more V-bits of the one or more intended spatiotemporal identifiers, wherein the one or more V-bits are v2, wherein v2 is gamma AND with the one or more intended spatiotemporal identifiers;
encrypting the decipherable message, with the one or more intended coordinates of the symmetric key XOR with $S_o$;
wherein the encrypted decipherable message is an encrypted message $C_m$;
transmitting the encrypted message $C_m$, P1, P2, v2, and gamma;
by the recipient;
receiving the public key from the sender;
receiving $C_m$, P1, P2, v2, and gamma;
calculating the symmetric key, wherein the symmetric key is calculated from the public key, P1, P2, v2, and gamma;
computing the one or more actual spatiotemporal identifiers, wherein the one or more actual spatiotemporal identifier are truncated by a minus one bits;
computing one or more shared O-bits of the one or more actual spatiotemporal identifiers;
wherein the one or more shared O-bits are $S_o'$, wherein $S_o'$ is gamma bar AND with the one or more actual spatiotemporal identifiers;
computing one or more V-bits of the one or more actual spatiotemporal identifiers,
wherein the one or more V-bits are v2', wherein v2' is gamma AND with the one or more actual spatiotemporal identifiers;
aborting decryption if v2' is equal to v2;
wherein one or more actual spatiotemporal identifiers is not adjacent to the one or more intended spatiotemporal identifiers;
decrypting the encrypted message $C_m$ symmetrically with one or more coordinates of the symmetric key XOR with the $S_o'$ to reproduce the decipherable message.

11. The method of claim 10 wherein the one or more coordinates of the symmetric key are selected from the group of symmetric key coordinates consisting of: x-coordinate, y-coordinate, or z-coordinate.

12. The method of claim 10 wherein the one or more intended spatiotemporal identifier is selected from any one or more spatiotemporal identifiers selected from the group consisting of: latitude, longitude, or coordinated time.

13. The method of claim 10 wherein the one or more actual spatiotemporal identifier is selected from any one or more spatiotemporal identifiers selected from the group consisting of: latitude, longitude, or time.

14. The method of claim 10 wherein the upper intended truncated value is different from the lower intended truncated value.

15. The method of claim 10 wherein the one or more coordinates of the symmetric key are selected from the group of the symmetric key coordinates consisting of: x-coordinate, y-coordinate, or z-coordinate.

16. The method of claim 10 wherein the upper intended truncated value is the upper spatiotemporal tolerance; and
wherein the lower intended truncated value is the lower spatiotemporal tolerance.

17. A non-transitory computer readable medium with computer executable instructions for encrypted communications, the computer readable medium having computer executable instructions for:
by a sender;
generating a first symmetric key, by generating a first random number and calculating the first symmetric key based at least in part on one or more intended spatiotemporal identifiers;
wherein the first symmetric key comprises one or more coordinates;
encrypting a decipherable message with the one or more coordinates of the first symmetric key to produce an encrypted message $D_m$;
generating a second symmetric key, by generating a second random number and calculating the second symmetric key based at least in part on a point generator;

wherein the second symmetric key comprises one or more coordinates;

encrypting the encrypted message $D_m$ with the one or more coordinates of the second symmetric key to produce an encrypted message $C_m$, wherein the encrypted message $C_m$ is an undecipherable message;

generating a random scalar k;

transmitting a public key to a recipient;

calculating a point P1 and a point P2;
wherein point P1 is the product of the random scalar k and the point generator, and point P2 is the sum of the second symmetric key with the product of the random scalar k and the public key;

transmitting the encrypted message $C_m$, point P1, and point P2;

by the recipient;

receiving the public key from the sender;

determining the one or more actual spatiotemporal identifiers;

receiving the encrypted message $C_m$, point P1, and point P2;

calculating the second symmetric key, wherein the second symmetric key is calculated from the public key, point P1, and point P2;

decrypting the encrypted message $C_m$ asymmetrically with one or more coordinates of the second symmetric key to reproduce the encrypted message $D_m$;

decrypting the encrypted message $D_m$ symmetrically with the one or more actual spatiotemporal identifiers to reproduce the decipherable message.

18. The medium of claim 17 wherein the one or more intended spatiotemporal identifier is selected from any one or more spatiotemporal identifiers selected from the group consisting of: latitude, longitude, or coordinated time.

19. The medium of claim 17 wherein the one or more actual spatiotemporal identifier is selected from any one or more spatiotemporal identifiers selected from the group consisting of: latitude, longitude, or time.

20. The medium of claim 17 wherein the random scalar k is generated once, from a finite field having a prime modulo of at least 256 bits.

* * * * *